United States Patent
Francis

[15] 3,678,164

[45] July 18, 1972

[54] COMPOSITIONS FOR INHIBITING ANOMALOUS DEPOSITION AND MOBILIZATION OF CALCIUM PHOSPHATE IN ANIMAL TISSUE

[72] Inventor: Marion D. Francis, Springfield Township, Hamilton County, Ohio

[73] Assignee: The Procter & Gamble Company, Cincinnati, Ohio

[22] Filed: Feb. 12, 1969

[21] Appl. No.: 798,807

Related U.S. Application Data

[63] Continuation-in-part of Ser. No. 709,871, March 4, 1968, abandoned.

[52] U.S. Cl. ........................................................424/204
[51] Int. Cl. ....................................................A61K 27/00
[58] Field of Search ................424/199, 204, 57; 260/502.5; 167/65 CH

[56] References Cited

UNITED STATES PATENTS

| | | | |
|---|---|---|---|
| 3,236,736 | 2/1966 | Fitch et al. | 424/227 |
| 3,234,124 | 2/1966 | Irani | 210/38 |
| 3,288,846 | 11/1966 | Irani et al. | 260/500 |
| 3,298,956 | 1/1967 | Irani et al. | 252/117 |
| 3,394,083 | 7/1968 | Yu Shen | 252/157 |

FOREIGN PATENTS OR APPLICATIONS

| | | | |
|---|---|---|---|
| 1,046,436 | 10/1966 | Great Britain | 424/227 |
| 753,207 | 1/1967 | Canada | |

OTHER PUBLICATIONS

Gurney, Dental Digest, Vol. 73 No. 5 May 1967 pages 228–230.
Bessman et al., Ann. Int. Med. Nov. 1957 pages 1036–1041.
Goldberg, Antibiotics Their Chemistry and Non-Medical Uses received in office Apr. 1964 p. 178.

*Primary Examiner*—Richard L. Huff
*Attorney*—Richard C. Witte, Jack D. Schaeffer and Louis G. Xiarhos

[57] ABSTRACT

Compositions for inhibiting anomalous deposition and mobilization of calcium phosphates in animal tissue, comprising an effective amount of certain tris(phosphonoalkyl)amines as herein defined, and a pharmaceutical carrier; and a method for treating or preventing conditions involving pathological calcification and hard tissue demineralization in an animal comprising administering to such animal said compositions.

12 Claims, No Drawings

COMPOSITIONS FOR INHIBITING ANOMALOUS DEPOSITION AND MOBILIZATION OF CALCIUM PHOSPHATE IN ANIMAL TISSUE

CROSS-REFERENCE TO RELATED APPLICATIONS

This application is a Continuation-In-Part of the copending patent application of Marion D. Francis, Ser. No. 709,871, filed Mar. 4, 1968 now abandoned.

BACKGROUND OF THE INVENTION

This invention relates to novel compositions having therapeutic and/or prophylactic effects. The invention further relates to a novel method for treating or preventing certain pathological conditions in animals.

A number of pathological conditions which can afflict warm-blooded animals involve abnormal calcium and phosphate metabolism. Such conditions may be divided into two broad categories.

1. Conditions which are characterized by anomalous mobilization of calcium and phosphate leading to general or specific bone loss or excessively high calcium and phosphate levels in the fluids of the body. Such conditions are sometimes referred to herein as pathological hard tissue demineralizations.

2. Conditions which cause or result from deposition of calcium and phosphate anomalously in the body. These conditions are sometimes referred to herein as pathological calcifications.

The first category includes osteoporosis, a condition in which bone hard tissue is lost disproportionately to the development of new hard tissue. Marrow and bone spaces become larger, fibrous binding decreases, and compact bone becomes cancellous and fragile. Osteoporosis can be subclassified as menopausal, senile, drug induces (e.g., adrenocorticoid as can occur in steroid therapy), disease induced (e.g., arthritic and tumor), etc., however, the manifestations are essentially the same. Another condition in the first category is Paget's disease (osteitis deformans) which is also characterized by bone loss. In this disease, dissolution of normal bone occurs which is then replaced by soft, poorly mineralized tissue such that the bone becomes deformed from pressures of weight bearing, particularly in the tibia and femur. This condition also frequently sponsors pathological deposition of calcium and phosphate.

The second category, involving conditions manifested by anomalous calcium and phosphate deposition, includes such afflictions as arthritis, neuritis, bursitis, tendonitis and other inflammatory conditions which predispose involved tissue to deposition of calcium phosphates, and hormonal imbalance, e.g., hyperparathyrodism, myositis ossificans progressiva, calcinosis universalis, resulting in calcification of soft tissues. Atherosclerosis is another condition in this category and involves degeneration and proliferate change in the intima which produces fibrous, lipoid plaques. If such plaques calcify, or if the inner walls of the arteries accumulate plaque and calcify, this condition is commonly referred to as arteriosclerosis.

Yet another condition in category (2) which results from anomalous calcium and phosphate deposition is stone or calculi formation in the bile duct, gall bladder, pancreas, salivary glands, tonsils, kidneys and bladder. Although some of such stones are not comprised primarily of calcium phosphate, it is likely that the original nidus is calcium phosphate. The formation of urinary calculi, i.e., urolithiasis, in cattle and sheep constitutes a major problem in veterinary medicine. It is estimated that from 5 to 10 percent of weanling calves suffer this affliction when they are taken off milk and start taking in other fluids.

As far as is known, no satisfactory medical treatment for the conditions of category (1) as described above has been developed prior to this invention although dietary control, fluorides, estrogens, and the hormone calcitonin (thyrocalcitonin) have been suggested or used for these conditions. Although certain inorganic phosphates such as pyrophosphates and longer chain condensed phosphates have been suggested for treatment of conditions in category (2), they have not been widely used because of their tendency to hydrolyze to the ineffective orthophosphate when administered to larger animals such as humans and cattle.

It is therefore an object of this invention to provide a composition for inhibiting anomalous deposition and mobilization of calcium phosphate in animal tissue.

It is a further object of this invention to provide an improved method for treatment of conditions involving pathological calcification and hard tissue demineralization in animals.

SUMMARY OF THE INVENTION

This invention is based on the discovery that certain tris(phosphonoalkyl)amines and their pharmaceutically acceptable salts reduce anomalous mobilization and deposition of calcium phosphates in animals. The invention thus involves a composition and method for treating or preventing conditions involving pathological demineralization of bony tissue and pathological calcium deposition in the soft tissue of animals. In its method aspect, the invention comprises administering to said animals an effective amount of a tris(phosphonoalkyl)amine as hereinafter characterized.

DETAILED DESCRIPTION OF THE INVENTION

In one of its aspects, this invention is a composition comprising an effective but non-toxic amount of a tris(phosphonoalkyl)amine conforming to the structural formula:

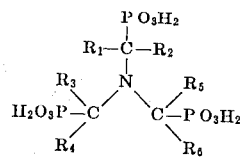

wherein $R_1$, $R_2$, $R_3$, $R_4$, $R_5$, and $R_6$ are each hydrogen or lower alkyl (1–4 carbon atoms), or a pharmaceutically acceptable salt thereof, such as alkali metal (e.g., sodium and potassium), alkaline earth metal (e.g., calcium and magnesium), non-toxic heavy metal (e.g., stannous and indium), and ammonium or low molecular weight substituted ammonium (e.g., mono-, di-, and triethanolammonium) salts; and a pharmaceutical carrier. The above described tris(phosphonoalkyl)amines and their pharmaceutically acceptable salts are referred to collectively hereinafter as "tris(phosphonoalkyl)amines."

The preferred tris(phosphonoalkyl)amines for the purpose of this invention are tris(phosphonomethyl)amine; tris(1-phosphonoethyl)amine; tris(2-phosphono-2-propyl)amine; and their pharmaceutically acceptable salts. Tris(phosphonomethyl)amine is especially preferred. The following are exemplary of compounds which can also be used.

(a) bis(phosphonomethyl)-1-phosphonoethyl amine;
(b) bis(phosphonomethyl)-2-phosphono-2-propyl amine;
(c) bis(1-phosphonoethyl)phosphonomethyl amine;
(d) bis(2-phosphono-2-propyl)phosphonomethyl amine;
(e) tris(1-phosphono-1-pentyl)amine;
(f) bis(phosphonomethyl)2-phosphono-2-hexyl amine; and
(g) the pharmaceutically acceptable salts of acids (a) through (f), e.g., sodium, potassium, calcium, magnesium, ammonium, triethanolammonium, diethanolammonium, and monoethanolammonium salts.

Mixtures of any of the foregoing tris(phosphonoalkyl)amines and/or salts can also be used in the practice of this invention.

The tris(phosphonoalkyl)amines can be prepared, for example, by first preparing the corresponding ester in accordance with the general reaction:

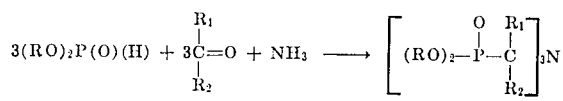

wherein R is alkyl and $R_1$ and $R_2$ are hydrogen or lower alkyl.

The free acids can be prepared by hydrolysis of the ester using strong mineral acids such as hydrochloric acid. The salts are, of course, prepared by neutralizing the acid with the base of the desired cation. The preparation of tris(phosphonoalkyl)amines is fully disclosed by Irani et al. in Canadian Pat. No. 753,207, issued Feb. 21, 1967.

The required dosage of tris(phosphonoalkyl)amine will vary with the particular condition being treated, the severity of the condition, the duration of treatment, and the specific tris(phosphonoalkyl)amine employed; however, single dosages can range from 0.01 to 500 mg. per kilogram of body weight, preferably 0.5 to 50 mg/kg (unless otherwise specified, the unit designated "mg/kg" as used herein refers to mg/kg of body weight), with up to four dosages daily. The higher dosages within this range are, of course, required in the case of oral administration because of limited absorption. Dosages greater than about 500 mg/kg may produce toxic symptoms and should be avoided. Moreover, daily dosages greater than about 2,000 mg/kg are not required to produce the desired effect and may produce toxic side effects. Dosages of less than about 0.01 mg/kg do not materially affect pathological calcification or demineralization, even administered intravenously. Preferably, dosages ranging from 0.5 to 50 mg/kg are employed when the tris(phosphonoalkyl)amines are administered orally. Table 1 below sets forth preferred dosages for various conditions which can be treated in accordance with this invention:

TABLE 1

| Condition | Oral dosage (mg/kg) Up to four times/day* |
|---|---|
| Osteoporosis (menopausal) | 1–25 |
| Osteoporosis (senile et al.) | 1–25 |
| Paget's Disease | 10–50 |
| Arthritis | 1–25 |
| Bursitis | 1–25 |
| Neuritis | 1–25 |
| Stones | 1–25 |

*A larger initial dosage may be required, e.g., up to 500 mg/kg followed by the specified dosage level.

The tris(phosphonoalkyl)amines can also be administered parenterally in aqueous solution by subcutaneous, intradermal, intramuscular or intravenous injection. The preferred dosage ranges by these modes of administration are as follows:

| Subcutaneous | 0.1–10 mg/kg |
| Intradermal | 0.1–10 mg/kg |
| Intramuscular | .05–5 mg/kg |
| Intravenous | .05–5 mg/kg |

For purposes of oral administration the tris(phosphonoalkyl)amines can be formulated in the form of capsules, tablets or granules. For treatment of non-human animals, the tris(phosphonoalkyl)amines are preferably incorporated in animal feed, feed supplements or feed concentrates. They can also be prepared in unit dosage form together with a pharmaceutical carrier, each unit dosage form containing from 15 mg. to 10 g. of tris(phosphonoalkyl)amine. The preferred concentration range of tris(phosphonoalkyl)amine in unit dosage forms intended for use by humans and smaller domesticated animals is from 15 mg. to 1,000 mg., more preferably 100 mg. to 500 mg. A higher concentration range, i.e., from 1 g. to 5 g. is preferred in unit dosage forms intended for treatment of larger animals such as cattle, horses, etc.

When administered orally, the compositions of this invention are preferably in a form adapted to minimal exposure of the tris(phosphonoalkyl)amines to the oral cavity. Although these compounds do not damage dental enamel when applied to the tooth surfaces at the relatively low concentrations typical of toothpaste, mouthwash, lozenges and the like intended for dental calculus prophylaxis, the substantially higher concentrations of tris(phosphonoalkyl)amines provided in the unit dosage form embodiments of this invention may demineralize dental enamel on repeated prolonged exposure. Thus oral administration is preferably effected with such unit dosage forms as capsules, pills, and tablets which are promptly ingested. Troches, chewable tablets and the like which typically remain in the oral cavity for a substantial time prior to ingestion are preferably avoided.

As used herein, the term "pharmaceutical carrier" denotes a solid or liquid filler diluent or encapsulating substance. Some examples of the substances which can serve as pharmaceutical carriers are sugars such as lactose, glucose and sucrose; starches such as corn starch and potato starch; cellulose and its derivatives, such as sodium carboxymethylcellulose, ethylcellulose, cellulose acetate; powdered tragacanth; malt; gelatin; talc; stearic acid; magnesium stearate; calcium sulfate; vegetable oils, such as peanut oil, cottonseed oil, sesame oil, olive oil, corn oil and oil of theobroma; polyols such as propylene glycol, glycerin, sorbitol, mannitol, and polyethylene glycol; agar; alginic acid; pyrogen-free water; isotonic saline; and phosphate buffer solutions, as well as other non-toxic compatible substances used in pharmaceutical formulations. Wetting agents and lubricants such as sodium lauryl sulfate, as well as coloring agents, flavoring agents and preservatives, can also be present.

The pharmaceutical carrier employed in conjunction with the tris(phosphonoalkyl)amines is used at a concentration sufficient to provide a practical size to dosage relationship. Preferably, the pharmaceutical carrier comprises from about 0.1 to 99 percent by weight of the total composition.

Animal feed compositions to which the tris(phosphonoalkyl)amines of this invention can be added generally include as feedstuffs a cellulosic roughage component such as hay, straw, cottonseed hulls, beet pulp, silage, ground corn cobs, corn stalks, etc. Protein-containing components such as whole grains, including corn, wheat, barley, oats, rye, millet and alfalfa; processed grains, including cottonseed meal, corn meal, soybean meal, linseed meal and other waste products from the oil expressing industry; animal protein including casein, gelatin, fish meal, and slaughterhouse wastes, are also required feedstuffs for a nutrionally balanced feed composition. Animal feed compositions can also contain natural oils, including animal fats, such as beef tallow, mutton tallow; fish oils, including eel, herring, menhaden, tuna and salmon oil; and whale oil. Vegetable oils such as soybean oil, sunflower oil, olive oil, safflower oil, corn oil, peanut oil, cottonseed oil, rice oil, millet oil, wheat germ oil and palm oil, can also be used.

In addition to the feedstuffs mentioned above, animal feed compositions can include supplemental sources of minerals, such as bone meal, salt, and the various trace minerals, such as salts of zinc, copper, manganese, magnesium, cobalt, iodine and iron. Antibiotics, steroids, anthelmintics and other medicants or growth stimulating substances can be incorporated in animal feeds. Various vitamins can be added to animal feed compositions to provide for deficiencies incident to the selection of other feed components. Other feedstuffs can be included such as casein, other milk by-products, and synthetic nitrogen sources such as urea.

The tris(phosphonoalkyl)amines can be incorporated in the total feed composition as described above or in intermediate feed concentrates or feed supplements which are adapted to be blended with the basic roughage and protein feedstuffs to prepare the final feed. In the feed industry the term "concentrate" is often used to denote a product which contains a relatively large quantity of one or more nutrients, such as high quality protein, minerals, vitamins and the like and which is adapted for addition to the basic feedstuffs to form a total or final feed. The term "supplement" is also used to denote a specific feedstuff or mixture thereof that is either added to or included in the concentrate portion of the total feed, or in the total feed itself. The tris(phosphonoalkyl)amines can be employed in accordance with this invention by incorporating same in feed supplements, concentrates or the total feed composition (all referred to hereinafter as "feed compositions"). For the purposes of this invention, the term "pharmaceutical carrier" is intended to encompass feed compositions.

Feed compositions containing a minor proportion of one or more of the tris(phosphonoalkyl)amines described herein incorporated in a major proportion of an animal foodstuff constitute a preferred embodiment of this invention inasmuch as they provide an effective and practical means of urolithiasis prophylasix for large herds of animals, especially during periods of feed-lot maintenance or limited grazing. Urolithiasis prophylaxis can be achieved in grazing herds by incorporating the tris(phosphonoalkyl)amines in block salt.

The concentration of tris(phosphonoalkyl)amine in feed compositions will of course vary with the weight of the animal to be treated and the proportion of the total diet which the feed composition comprises. When herds of animals are to be treated, the level of tris(phosphonoalkyl)amine in the feed composition should be sufficient to provide the dosages specified herein based on the average feed consumption and weight of the animals. In any event, the tris(phosphonoalkyl)amines comprise a minor proportion of the total feed composition.

While it is not intended that this invention be limited by a particular theory of operation, in the case of those conditions which cause or result from deposition of calcium and phosphate anomalously in the body, it is believed that the tris(phosphonoalkyl)amines interfere with the conversion of x-ray amorphous calcium phosphate to crystalline calcium hydroxylapatite and thus greatly reduce or prevent the formation of calcium phosphate deposits. Although certain inorganic polyphosphates also inhibit crystal growth soon after administration to an animal, they are hydrolyzed to the orthophosphate species which has no crystal growth inhibition properties and, in fact, can itself take part in hydroxylapatite formation. The tris(phosphonoalkyl)amines of this invention, on the other hand, are stable to hydrolysis and remain active after administration, even to larger animals such as cattle.

CRYSTAL GROWTH INHIBITION TEST

The efficacy of the tris(phosphonoalkyl)amines of this invention in inhibiting crystal growth is demonstrated by the Crystal Growth Inhibition Test which is conducted as follows:

One milliliter of a 0.1 M stock solution of $NaH_2PO_4 \cdot H_2O$ is diluted with 22 ml. of distilled water. One milliliter of an aqueous solution of the disodium salt of tris(phosphonomethyl)amine (at a concentration sufficient to provide the desired ultimate concentration in the reaction mixture) is added to the diluted $NaH_2PO_4$ solution and the solution is adjusted to pH 7.4 with sodium hydroxide. To this solution is added 1 ml. of a 0.1 M solution of $CaCl_2 \cdot 2H_2O$ preadjusted to pH 7.4 with sodium hydroxide. This mixture is held at a constant pH 7.4 throughout the reaction period.

After a sufficient reaction time as determined by the operator, generally within 90 minutes, the solution is filtered through a 0.45 $\mu$ Millipore filter pad. The precipitate is air-dried and analyzed by X-ray diffraction. The solid calcium phosphate precipitated from the above-described solution without a tris(phosphonoalkyl)amine gives a typical hydroxylapatite pattern, while the calcium phosphate precipitated under the same conditions but in the presence of small amounts of the tris(phosphonoalkyl)amine of this invention is amorphous to X-rays.

Those compounds which are effective in inhibiting the growth of hydroxylapatite crystals at concentrations of less than $1.5 \times 10^{-3}$ M under the conditions of this test are found to inhibit anomalous mobilization and deposition of calcium phosphates in animal tissue, while several compounds outside the scope of this invention that have little or no effect in this test are ineffective in vivo.

The employment of $6.69 \times 10^{-5}$ M of tris(phosphonomethyl)amine in the Crystal Growth Inhibition test described above resulted in the formation of an amorphous calcium phosphate rather than crystalline calcium hydroxylapatite as occurs without tris(phosphonoalkyl)amine and the total formation of calcium orthophosphate was greatly decreased.

The capacity of the tris(phosphonoalkyl)amines to inhibit anomalous calcification is also demonstrated in vivo as follows:

This test is based on the observation that massive dosages of vitamin $D_3$ induces extensive calcification in the aorta of rats [see Gillman et al., *J. Exp. Path.*, 40:1 (1960)]. Female Wister rats each weighing 150 to 200 g. are randomly divided into a control group of 60 animals and test groups each containing 10 animals. The animals are kept in a thermostabilized room at 22° C. and receive a normal diet and tap water ad libitum throughout the test period. All of the animals are given daily doses of 75,000 units/kg. of vitamin $D_3$ via stomach tube for 5 days beginning on the third and ending on the 7th day of the test. Beginning on the first day (prior to the first dosage of vitamin $D_3$) until the conclusion of the test, the test groups of animals are administered specified dosages of tris(phosphonoalkyl)amines, orally by stomach tube and subcutaneously, respectively, once per day. In each case the tris(phosphonalkyl)amines are dissolved in 0.9% NaCl when given at the lower dosage, and in distilled water when given at the higher dosage. The solution is adjusted to pH 7.4 and the amount of solution given is 2 ml/kg of body weight. On the 15th day the animals are sacrificed and their aortas are dissected and dried for 48 hours at 120° C. After determination of the dry weight, the aortas are ashed in a muffle oven at 800° C. for 6 hours. The residue is dissolved in 0.2 N HCl and calcium is titrated with EDTA using calcichrome as an indicator in a titration photometer, all in accordance with the methods described by Irving et al., *Proc. Soc. Exp. Biol. Med.*, 122, No. 3, 852 (1966).

The calcium values secured in this test reveal that several representative compositions of this invention materially reduce vitamin $D_3$-induced calcification in the aorta of rats.

EXAMPLE I

Capsules are prepared by conventional methods, comprised as follows:

| Ingredient | mg per capsule |
|---|---|
| Disodium salt of tris(phosphonomethyl)amine | 350.00 |
| Starch | 55.60 |
| Sodium lauryl sulfate | 2.90 |

The above capsules administered orally twice daily substantially reduces bone decalcification in a patient weighing approximately 70 kilograms afflicted with osteoporosis. Similar results are attained when the dipotassium salt of tris(phosphonomethyl)amine; the diammonium salt of tris(phosphonomethyl)amine; the monocalcium salt of tris(phosphonomethyl)amine; and the monomagnesium salt of tris(phosphonomethyl)amine, respectively, are employed in the above-described capsule in place of the disodium salt.

EXAMPLE II

Tablets are prepared by conventional methods, formulated as follows:

| Ingredient | mg per tablet |
|---|---|
| Tris(phosphonomethyl)amine | 25.00 |
| Lactose | 40.00 |
| Starch | 2.50 |
| Magnesium stearate | 1.00 |

When administered orally four times daily, the above composition significantly reduces the formation of renal calculi in a patient weighing approximately 50 kilograms, having a predisposition to such formation.

Similar results are achieved with tablets formulated as above but replacing tris(phosphonomethyl)amine with the disodium salt of tris(1-phosphonoethyl)amine; the trisodium salt of tris(2-phosphono-2-propyl)amine; the distannous salt of bis(phosphonomethyl)-1-phosphonoethylamine; and bis(1-phosphonoethyl)phosp onomethylamine; respectively.

The lactose employed in this example is replaced by sucrose and the magnesium stearate by sodium carboxymethylcellulose without affecting the desired properties of the tablet.

Additional tablet compositions are prepared in accordance with the invention as follows:

| Examples | Mg. per tablet | | | | | | |
|---|---|---|---|---|---|---|---|
| | III | IV | V | VI | VII | VIII | IX |
| Ingredient: | | | | | | | |
| Tetrasodium salt of bis(2-phosphono-2-propyl)phosphonomethyl amine | 80.0 | | | | | | |
| Pentasodium salt of tris(1-phosphono-1-pentyl)amine | | 100.0 | | | | | |
| Dimagnesium salt of bis(phosphonomethyl)-2-phosphono-2-hexyl amine | | | 120.0 | | | | |
| Pentasodium salt of tris(phosphonomethyl)amine | | | | 50.0 | | | 25.0 |
| Tris(1-phosphonoethyl)amine | | | | | 85.0 | | 25.0 |
| Tris(1-phosphono-1-butyl)amine | | | | | | 30.0 | |
| Lactose | 97.0 | 31.0 | 31.0 | 73.0 | 97.0 | 30.0 | 30.0 |
| Starch | 45.0 | 13.0 | 13.0 | 57.0 | 45.0 | | |
| Stearic acid | | | | 6.0 | | | |
| Talc | 35.5 | 6.5 | 6.5 | 9.0 | 35.0 | 5.0 | 5.0 |
| Calcium stearate | | 1.0 | 1.0 | | | 1.0 | 1.0 |
| Ethyl cellulose | | 16.0 | 16.0 | | | 15.0 | 15.0 |

Solutions for parenteral administration are prepared by dissolving the following tris(phosphonoalkyl)amines in distilled water at specified concentration, adjusting the pH to 7.4 with the base corresponding to the indicated salt form, or sodium hydroxide in the case of the acids and sterilizing same by standard sterilization techniques.

| Ex. | Phosphonate | Conc. mg/ml |
|---|---|---|
| X | Bis(triethanolammonium) salt of tris(1-phosphonoethyl)amine | 10.0 |
| XI | Bis(diethanolammonium) salt of tris(1-phosphono-1-propyl)amine | 15.0 |
| XII | Bis(monoethanolammonium) salt of bis(phosphonomethyl)-1-phosphonoethyl amine | 5.0 |
| XIII | Disodium salt of tris(phosphonomethyl)amine | 13.0 |

The solutions of the foregoing examples when administered by injection to animals in an amount sufficient to provide desired dosage levels as hereinbefore specified substantially reduces pathological calcification and hard tissue demineralization. Preferably, the solutions are packaged in sealed ampules for single dosage hypodermic injections.

EXAMPLE XIV

A complete feed composition embodying the present invention is prepared by grinding and mixing the following:

| Component | Parts by Weight |
|---|---|
| Timothy hay | 960 |
| Dehydrated alfalfa | 40 |
| Yellow corn | 600 |
| Corn starch | 310 |
| Iodized salt | 10 |
| Bone meal | 20 |
| Seal salt | 2 |
| Soybean meal | 30 |
| Biuret | 28 |
| Disodium salt of tris(phosphonomethyl)amine | 0.694 |

This composition is fed to 400 pound weanling steers at the rate of approximately 12 pounds per day. The average dosage of disodium salt of tris(phosphonomethyl)amine effected in this manner is about 1.8 g. per day. Animals placed on this feed experience a substantially lower incidence of urolithiasis than control animals receiving the same feed but without the disodium tris(phosphonomethyl)amine salt.

Similar results are attained when tris(phosphonomethyl)amine; tris(1-phosphonoethyl)amine; tris(2-phosphono-2-propyl)amine; bis(phosphonomethyl)-1-phosphonoethyl amine; bis(phosphonomethyl)-2-phosphono-2-propyl amine; bis(1-phosphonoethyl)phosphonomethyl amine; bis(2-phosphono-2-propyl)phosphonomethyl amine; tris(1-phosphono-1-pentyl)amine; bis(phosphonomethyl)2-phosphono-2-hexyl amine; and tris(1-phosphono-1-butyl)amine, respectively, are employed in the above described feed composition in place of the disodium salt of tris(phosphonomethyl)amine.

EXAMPLE XV

A supplementary feed concentrate is prepared by intimately admixing the following:

| Component | Parts by Weight |
|---|---|
| Biuret | 400 |
| Brewer's dried grains | 25 |
| Dehydrated alfalfa | 43 |
| Iodized salt | 10 |
| Tricalcium phosphate | 2 |
| Tris(phosphonomethyl)amine | 4 |

This composition is suitable for mixing with silage, grain, hay, ground grain and the like for preparing total feed compositions for ruminant livestock. When fed as a supplement to legumes consumed by grazing weanling lambs at the rate of 0.25 pounds per day, this supplement greatly reduces the incidence of urolithiasis.

Similar results are achieved with a feed concentrate formulated as above but replacing tris(phosphonomethyl)amine with the disodium salt of tris(1-phosphonoethyl)amine; the trisodium salt of tris(2-phosphono-2-propyl)amine; the distannous salt of bis(phosphonomethyl)-1-phosphonoethyl amine; the tetrasodium salt of bis(2-phosphono-2-propyl)phosphonomethyl amine; the pentasodium salt of tris(1-phosphono-1-pentyl)amine; the dimagnesium salt of bis(phosphonomethyl)-2-phosphono-2-hexyl amine; the pentasodium salt of tris(phosphonomethyl)amine; the bis(triethanolammonium) salt of tris(1-phosphonoethyl)amine; the bis(diethanolammonium) salt of tris(1-phosphono-1-propyl)amine; the bis(monoethanolammonium) salt of bis(phosphonomethyl-1-phosphonoethyl amine; and the disodium salt of tris(phosphonomethyl)amine, respectively.

What is claimed is:

1. A pharmaceutical composition in dosage unit form for systemic administration to animals for inhibiting anomalous deposition and mobilization of calcium phosphate in animal tissue consisting essentially of from 15 mg. to 1000 mg. of a tris(phosphonoalkyl)amine selected from the group consisting of:

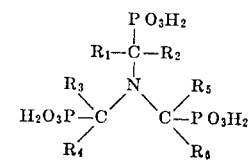

wherein $R_1$, $R_2$, $R_3$, $R_4$, $R_5$, and $R_6$ are independently selected from the group consisting of hydrogen and lower alkyl and the pharmaceutically acceptable salts thereof; and a pharmaceutical carrier.

2. The composition of claim 1 wherein the tris(phosphonoalkyl)amine is a member selected from the group consisting of tris(phosphonomethyl)amine and the alkali metal, alkaline earth metal, non-toxic heavy metal, ammonium, and low molecular weight ammonium salts thereof.

3. The composition of claim 1 wherein the tris(phosphonoalkyl)amine is a member selected from the group consisting of tris(1-phosphonoethyl)amine and the alkali metal, alkaline earth metal, non-toxic heavy metal, ammonium, and low molecular weight ammonium salts thereof.

4. The composition of claim 1 wherein the tris(phosphonoalkyl)amine is a member selected from the group consisting of tris(2-phosphono-2-propyl)amine and the alkali metal, alkaline earth metal, non-toxic heavy metal, ammonium, and low molecular weight ammonium salts thereof.

5. A method for inhibiting anomalous deposition and mobilization of calcium phosphate in animal tissue which comprises systemically administering to said animals a composition consisting of (1) a non-toxic and effective amount of a tris(phosphonoalkyl)amine selected from the group consisting of:

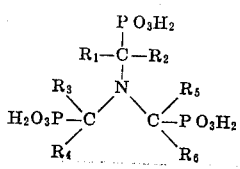

wherein $R_1$, $R_2$, $R_3$, $R_4$, $R_5$ and $R_6$ are independently selected from the group consisting of hydrogen and lower alkyl, and the pharmaceutically acceptable salts thereof; and (2) a pharmaceutical carrier.

6. The method of claim 5 wherein the tris(phosphonoalkyl)amine is a member selected from the group consisting of tris(phosphonomethyl)amine and the alkali metal, alkaline earth metal, non-toxic heavy metal, ammonium, and low molecular weight ammonium salts thereof.

7. The method of claim 5 wherein the tris(phosphonoalkyl)amine is a member selected from the group consisting of tris(1-phosphonoethyl)amine and the alkali metal, alkaline earth metal, non-toxic heavy metal, ammonium, and low molecular weight ammonium salts thereof.

8. A method for treating osteoporosis comprising systemically administering to an animal afflicted therewith a composition consisting of tris(phosphonomethyl)amine or a pharmaceutically acceptable salt thereof, and a pharmaceutical carrier.

9. A method for treating arthritis comprising systemically administering to an animal afflicted therewith a composition consisting of tris(phosphonomethyl)amine or a pharmaceutically acceptable salt thereof and a pharmaceutical carrier.

10. A method for treating Paget's disease comprising systemically administering to an animal afflicted therewith a composition consisting of tris(phosphonomethyl)amine or a pharmaceutically acceptable salt thereof and a pharmaceutical carrier.

11. A method for treating urolithiasis comprising systemically administering to an animal afflicted therewith a composition consisting of tris(phosphonomethyl)amine or a pharmaceutically acceptable salt thereof and a pharmaceutical carrier.

12. A method for treating arteriosclerosis comprising systemically administering to an animal afflicted therewith a composition consisting of tris(phosphonomethyl)-amine or a pharmaceutically acceptable salt and a pharmaceutical carrier.

* * * * *